United States Patent
Li et al.

(10) Patent No.: US 11,418,355 B2
(45) Date of Patent: Aug. 16, 2022

(54) POWER SOURCING EQUIPMENT AND CONNECTION CHECKING METHOD

(71) Applicant: REALTEK SEMICONDUCTOR CORPORATION, Hsinchu (TW)

(72) Inventors: He Li, Suzhou (CN); Rui Wang, Suzhou (CN); Qi-Cai Tang, Suzhou (CN); Min Zhang, Suzhou (CN); Teng-Yue Zhang, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/234,836

(22) Filed: Apr. 20, 2021

(65) Prior Publication Data

US 2021/0336806 A1 Oct. 28, 2021

(30) Foreign Application Priority Data

Apr. 24, 2020 (CN) .......................... 202010332466.7

(51) Int. Cl.
*H04L 12/10* (2006.01)
(52) U.S. Cl.
CPC .................................... *H04L 12/10* (2013.01)
(58) Field of Classification Search
CPC .................................. H04L 12/10; G06F 1/26
See application file for complete search history.

(56) References Cited

U.S. PATENT DOCUMENTS

| 2007/0165548 A1* | 7/2007 | Woo | H04L 12/10 370/283 |
|---|---|---|---|
| 2016/0197734 A1* | 7/2016 | Darshan | H04L 12/10 307/1 |
| 2018/0375673 A1 | 12/2018 | Wendt et al. | |

FOREIGN PATENT DOCUMENTS

TW 201837721 A 10/2018

\* cited by examiner

*Primary Examiner* — Ryan Johnson
(74) *Attorney, Agent, or Firm* — WPAT, PC (57) ABSTRACT

A power sourcing equipment includes a control logic circuit and current source circuits that are coupled to a powered device via first and second wire pairs of a network cable respectively. The control logic circuit controls one of the current source circuits to drain a current from the powered device via the first wire pair during a first interval, to detect a first voltage of the first wire pair and a second voltage of the second wire pair, and controls the current source circuits to respectively drain currents from the powered device via the first and the second wire pairs during a second interval, to detect a third voltage of the first wire pair and a fourth voltage of the second wire pair, and determines whether the powered device is a single signature or a dual signature according to the first to the fourth voltages.

20 Claims, 5 Drawing Sheets

POWER SOURCING EQUIPMENT AND CONNECTION CHECKING METHOD

BACKGROUND

1. Technical Field

The present disclosure relates to a power sourcing equipment. More particularly, the present disclosure relates to a power sourcing equipment for providing power to Ethernet and a connection checking method thereof.

2. Description of Related Art

A technology of power over Ethernet (POE) allows a network cable to transmit data and power to a powered device simultaneously. In the specification of IEEE 802.3bt, the powered device may be a single signature powered device or a dual signature powered device. In order to configure the power source correctly, a power sourcing equipment is required to detect whether the powered device is the single signature powered device or the dual signature powered device during a connection progress.

SUMMARY

In some embodiments, a power sourcing equipment includes a plurality of current source circuits and a control logic circuit. The plurality of current source circuits are configured to be coupled to a powered device via a first pair of wires and a second pair of wires in a network cable respectively. The control logic circuit is configured to: control a first current source circuit in the plurality of current source circuits to drain a current from the powered device via the first pair of wires during a first interval, in order to detect a first voltage on the first pair of wires and a second voltage on the second pair of wires; control the plurality of current source circuits to drain a plurality of currents from the powered device via the first pair of wires and the second of pair of wires respectively during a second interval, in order to detect a third voltage on the first pair of wires and a fourth voltage on the second pair of wires; and determine whether the powered device is a single signature powered device or a dual signature powered device according to the first voltage, the second voltage, the third voltage, and the fourth voltage.

In some embodiments, a connection checking method includes the following operations: controlling a first current source circuit to drain a current from a powered device via a first pair of wires in a network cable during a first interval, in order to detect a first voltage on the first pair of wires and a second voltage on a second pair of wires in the network cable; controlling the first current source circuit and a second current source circuit to drain a plurality of currents from the powered device via the first pair of wires and the second of pair of wires respectively during a second interval, in order to detect a third voltage on the first pair of wires and a fourth voltage on the second pair of wires; and determining whether the powered device is a single signature powered device or a dual signature powered device according to the first voltage, the second voltage, the third voltage, and the fourth voltage.

These and other objectives of the present disclosure will no doubt become obvious to those of ordinary skill in the art after reading the following detailed description of the preferred embodiments that are illustrated in the various figures and drawings.

DETAILED DESCRIPTION

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1A:
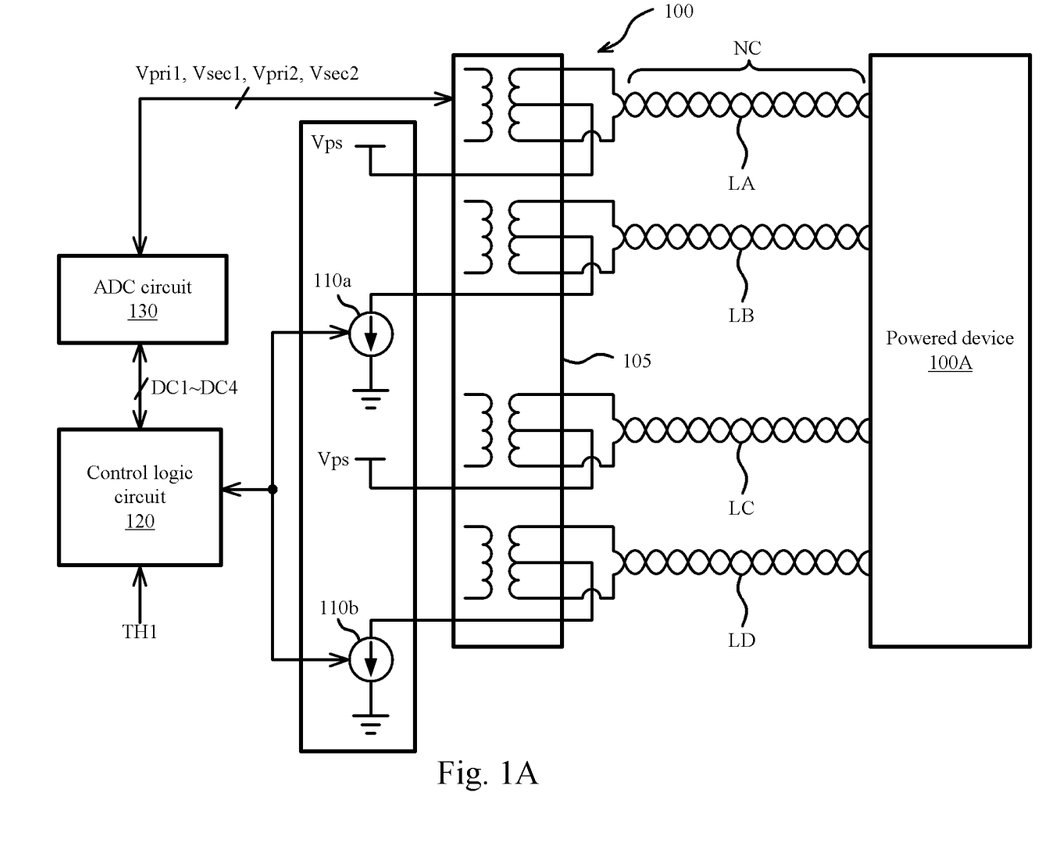
FIG. 1A is a schematic diagram of a power sourcing equipment according to some embodiments of the present disclosure.

FIG. 1A is a schematic diagram of a power sourcing equipment 100 according to some embodiments of the present disclosure. In some embodiments, the power sourcing equipment 100 may be applied with a Power over Ethernet (POE) system. For example, the power sourcing equipment 100 is coupled to a powered device 100A via a network cable NC, in which the network cable NC may be a twisted pair having a RJ45 connector. The power sourcing equipment 100 provides electrical energy and/or transmits data to the powered device 100A via the network cable NC. The network cable NC includes multiple pairs of wires, in which each pair of wires corresponds to one channel. For example, a wire LA and a wire LB are a first pair of wires corresponding to a first channel, and a wire LC and a wire LD are a second pair of wires corresponding to a second channel.

The power sourcing equipment 100 includes a slot 105, current source circuits 110a and 110b, a control logic circuit 120, and an analog to digital converter (ADC) circuit 130. The slot 105 is configured to be connected to the network cable NC, in order to be connected to the powered device 100A.

The current source circuits 110a and 110b are coupled to the wire LB and the wire LD respectively, in order to be connected to the powered device 100A. Transformers in the slot 105 being connected to the wire LA and the wire LC are for receiving a voltage Vps. In some embodiments, the current source circuit 110a and/or the current source circuit 110b may be a variable current source circuit. In some embodiments, the current source circuit 110a and/or the current source circuit 110b may be an active current source circuit or a passive current source circuit.

The configuration of the slot 105 is given for illustrative purposes, and the present disclosure is not limited thereto. For example, in some other embodiments, the transformer in the slot 105 being connected to the wire LA (or the wire LC) may be connected to an active current source circuit, and the transformer in the slot 105 being connected to the wire LB (or the wire LD) receives a low voltage (e.g., a ground voltage). In some embodiments, the transformer in the slot 105 being connected to the wire LA (or the wire LC) may be connected to a first current source circuit, and the transformer in the slot 105 being connected to the wire LB (or the wire LD) may be connected to a second current source circuit, in which at least one of the first current source circuit or the second current source circuit is an active current source circuit.

The control logic circuit 120 may selectively control at least corresponding one of the current source circuit 110a or the current source circuit 110b to drain a current from the powered device 100A via at least corresponding one of the first channel or the second channel, in order to check the connection. With operations of draining current(s), the control logic circuit 120 is able to detect a voltage Vpri1 on the first pair of wires (i.e., the wires LA and LB) during an interval T1 and a voltage Vpri2 on the first pair of wires during an interval T2, and to detect a voltage Vsec1 on the second pair of wires (i.e., the wires LC and LD) during the interval T1 and a voltage Vsec2 on the second pair of wires during the interval T2. The control logic circuit 120 may determine whether the powered device 100 is a single signature powered device or a dual signature powered device according to according to the voltage Vpri1, the voltage Vpri2, the voltage Vsec1, and the voltage Vsec2.

Figure 3:
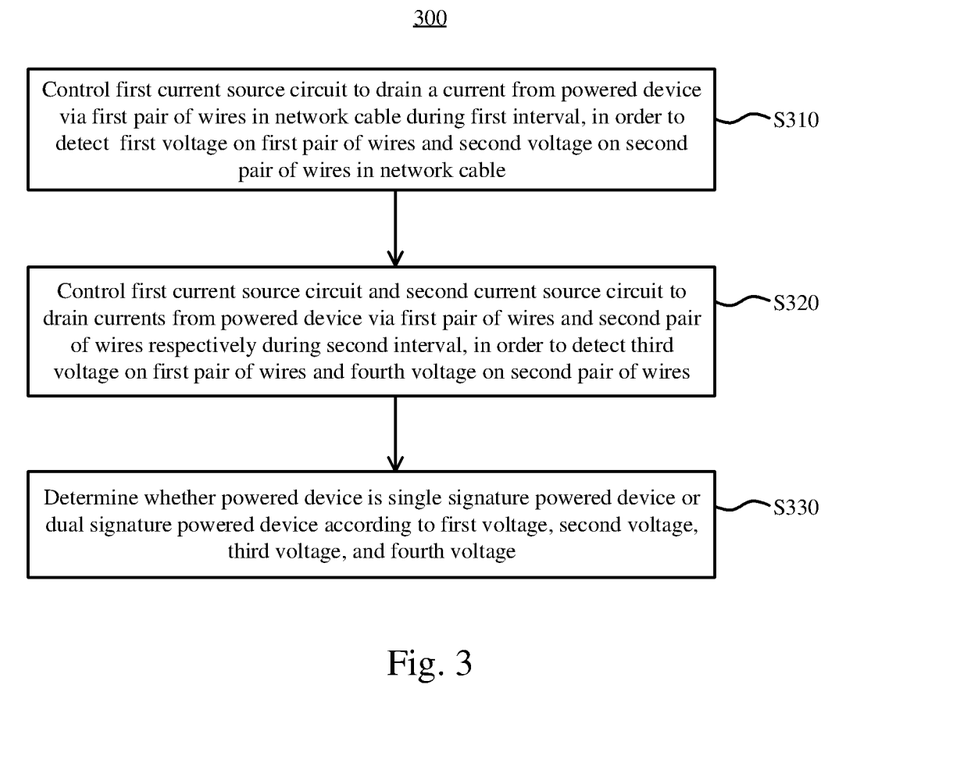
FIG. 3 is a flow chart of a connection checking method according to some embodiments of the present disclosure.

In some embodiments, the control logic circuit 120 may be implemented with one or more digital circuits that perform a connection checking method 300 in FIG. 3. For example, the control logic circuit 120 may be a microcontroller circuit, a digital signal processor circuit, or the like. The above implementations of the control logic circuit 120 are given for illustrative purposes, and the present disclosure is not limited thereto.

The ADC circuit 130 is coupled to the slot 105, in order to receive the voltages Vpri1, Vpri2, Vsec1, and Vsec2. The ADC circuit 130 converts the voltages Vpri1, Vpri2, Vsec1, and Vsec2 into digital codes DC1-DC4, respectively. The control logic circuit 120 acquires information about the voltage Vpri1, Vpri2, Vsec1, and Vsec2 according to the digital codes DC1-DC4, and determines whether the powered device 100A the single signature powered device or the dual signature power device.

Figure 1B:
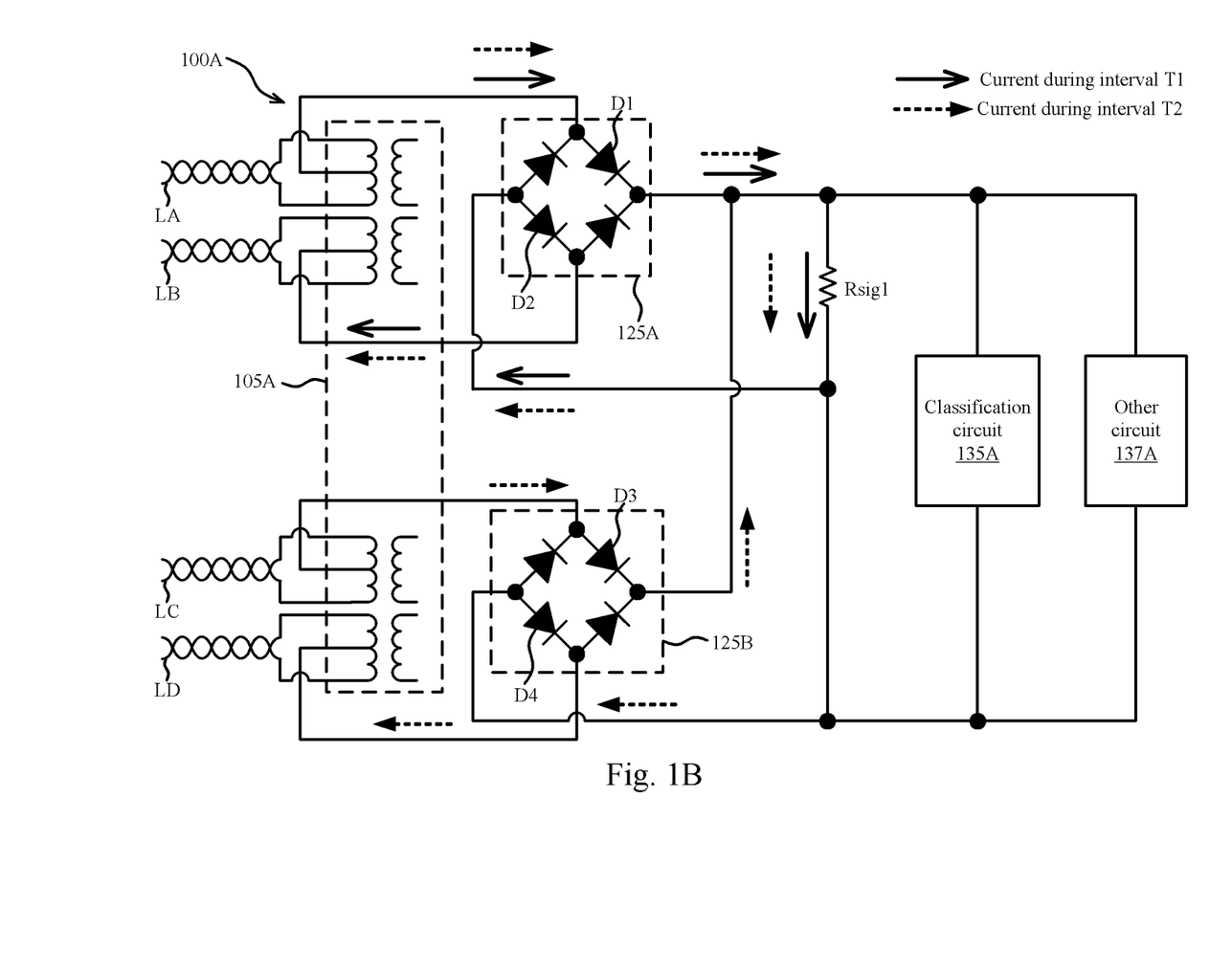
FIG. 1B is a schematic diagram of the powered device in FIG. 1A according to some embodiments of the present disclosure.

FIG. 1B is a schematic diagram of the powered device 100A in FIG. 1A according to some embodiments of the present disclosure. The powered device 100A includes a slot 105A, a rectifier circuit 125A, a rectifier circuit 125B, a signature resistor Rsig1, a classification circuit 135A, and other circuit 137A. The slot 105A is configured to be connected to the network cable NC, in order to be connected to the power sourcing equipment 100. The rectifier circuit 125A is coupled to the first pair of wires, in order to rectify the received current. The rectifier circuit 125B is coupled to the second pair of wires, in order to rectify the received current.

In this example, the powered device 100A is a single signature powered device. The first pair of wires and the second pair of wires share the same signature resistor Rsig1 and the classification circuit 135A. The signature resistor Rsig1 is a resistor for signature detection in the specification of IEEE 802.3bt, the classification circuit 135A is a circuit for classification in the specification of IEEE 802.3bt. The other circuit 173A is a load circuit of the powered device 100A, which may be, but not limited to, a controller circuit, a DC to DC converter circuit, and so on.

Figure 1C:
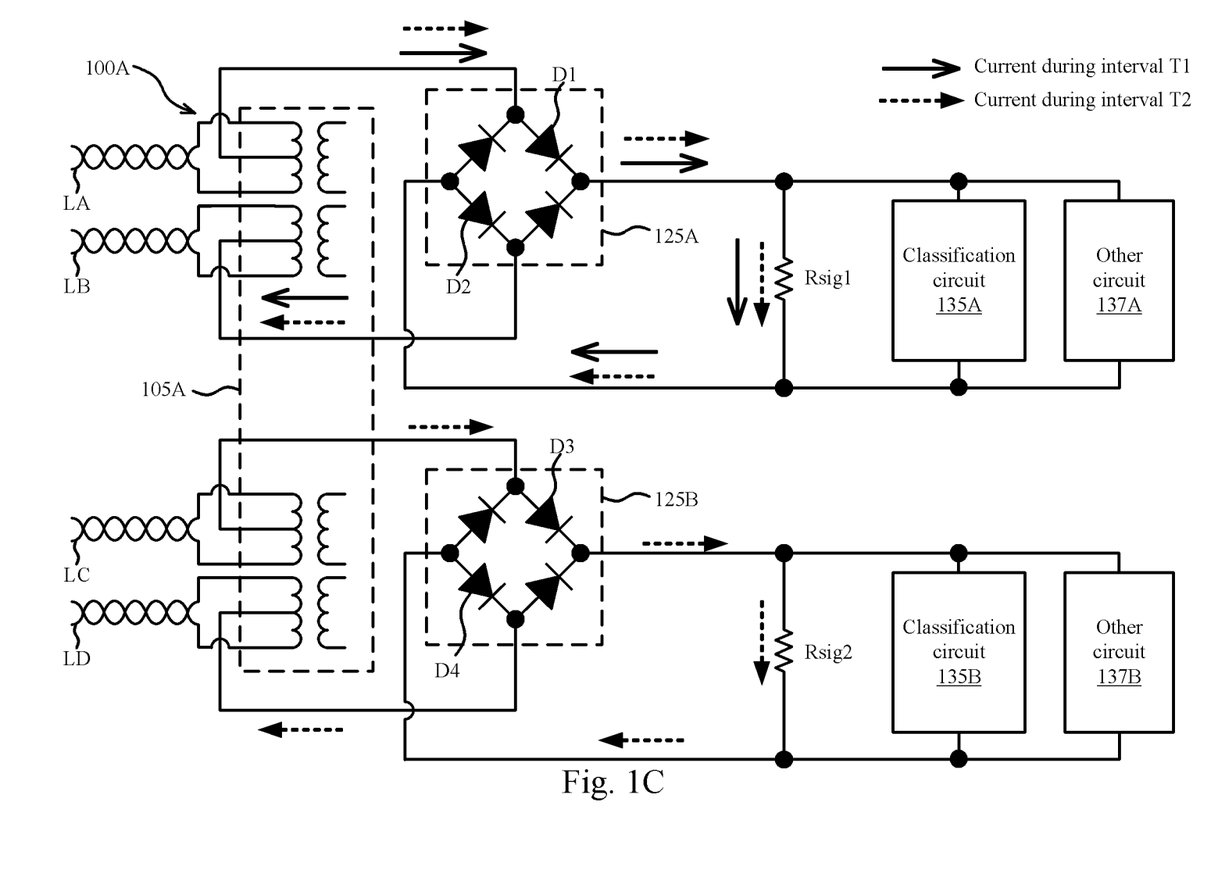
FIG. 1C is a schematic diagram of the powered device in FIG. 1A according to some embodiments of the present disclosure.

FIG. 1C is a schematic diagram of the powered device 100A in FIG. 1A according to some embodiments of the present disclosure. Compared with FIG. 1B, the powered device 100A in FIG. 1A further includes a signature resistor Rsig2, a classification circuit 135B, and other circuit 137B. In this example, the powered device 100A is the dual signature powered device. Each of the first pair of wires and the second pair of wires is coupled to an independent signature resistor and classification circuit. For example, the first pair of wires is coupled to the signature resistor Rsig1 and the classification circuit 135A, and the second pair of wires is coupled to the signature resistor Rsig2 and the classification circuit 135B. The signature resistor Rsig2 is a resistor for signature detection in the specification of IEEE 802.3bt, and the classification circuit 135B is a circuit for classification in the specification of IEEE 802.3bt. Similar to the other circuit 137A, the other circuit 137B may be a load circuit of the powered device 100A, which may be, but not limited to, a controller circuit, a DC to DC converter circuit, and so on.

Figure 2A:
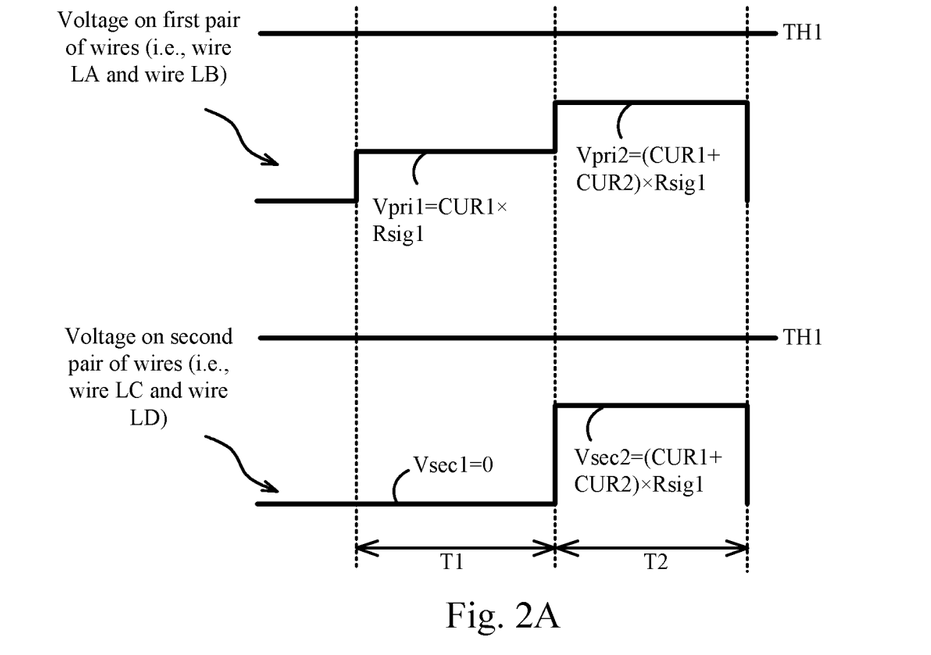
FIG. 2A is a schematic diagram illustrating waveforms of related signals in FIG. 1A according to some embodiments of the present disclosure.

FIG. 2A is a schematic diagram illustrating waveforms of related signals in FIG. 1A according to some embodiments of the present disclosure. For ease of understanding operations of the control logic circuit 120, reference is made to FIG. 1A, FIG. 1B, and FIG. 2B. During the interval T1, the control logic circuit 120 controls the current source circuit 110a to drain a current (which is referred to as "current CUR1" hereinafter, and its current direction is shown with a solid line) from the powered device 100A via the first pair of wires. During the interval T1, the control logic circuit 120 controls the current source circuit 110b not to drain a current (which is referred to as "current CUR2" hereinafter) from the powered device 100A via the second pair of wires. In other words, during the interval T1, the current CUR2 is zero. As shown in FIG. 1B, during the interval T1, the current CUR1 flows to the wire LB via a diode D1 of the rectifier circuit 125A, the signature resistor Rsig1, and a diode D2 of the rectifier circuit 125A. Under this condition, as shown in FIG. 2A, the voltage Vpri1 on the first pair of wires during the interval T1 is equivalent to a voltage drop on the signature resistor Rsig1, i.e., Vpri1=CUR1×Rsig1.

Furthermore, as the control logic circuit 120 does not control the current source circuit 110b to drain current from the second pair of wires, a level on an anode of a diode D3 in the rectifier circuit 125B is clamped to a zero volt (V) via a circuit (e.g., a resistor (not shown)) in the power sourcing equipment 100. Under this condition, the voltage Vsec1 on the second pair of wires during the interval T1 is 0V. Moreover, the diode D3 and a diode D4 are not turned on, and do not affect a flowing direction of the current CUR1.

During the interval T2, the control logic circuit 120 controls the current source circuit 110a to drain the current CUR1 (the direction is shown with a dotted line) from the powered device 100A via the first pair of wires. During the interval T2, the control logic circuit 120 controls the current source circuit 110b to drain a current CUR2 (which is shown with a dotted line) from the powered device 100A via the second pair of wires. In this example, the first pair of wires and the second pair of wires share the same the signature resistor Rsig1. Accordingly, the current flowing to the first pair of wires and the second pair of wires during the interval T2 is a sum of the current CUR1 and the current CUR2. Under this condition, as shown FIG. 2A, the voltage Vpri2 on the first pair of wires during the interval T2 is equivalent to a voltage drop of the signature resistor Rsig1, i.e., Vpri2=(CUR1+CUR2)×Rsig1. Similarly, the voltage Vsec2 on the second pair of wires is equivalent to a voltage drop of the voltage Vsec2, i.e., Vsec2=(CUR1+CUR2)×Rsig1.

In some embodiments, the control logic circuit 120 compares the voltage Vpri1 with the voltage Vpri2, and to compare the voltage Vpri2 with the voltage Vsec2, in order to determine whether the powered device 100A is a single signature powered device. As shown in FIG. 2A, if the voltage Vpri1 is lower than the voltage Vpri2, and the voltage Vpri2 is the same as the voltage Vsec2, the control logic circuit 120 determines that the powered device 100A is the single signature power device.

Figure 2B:
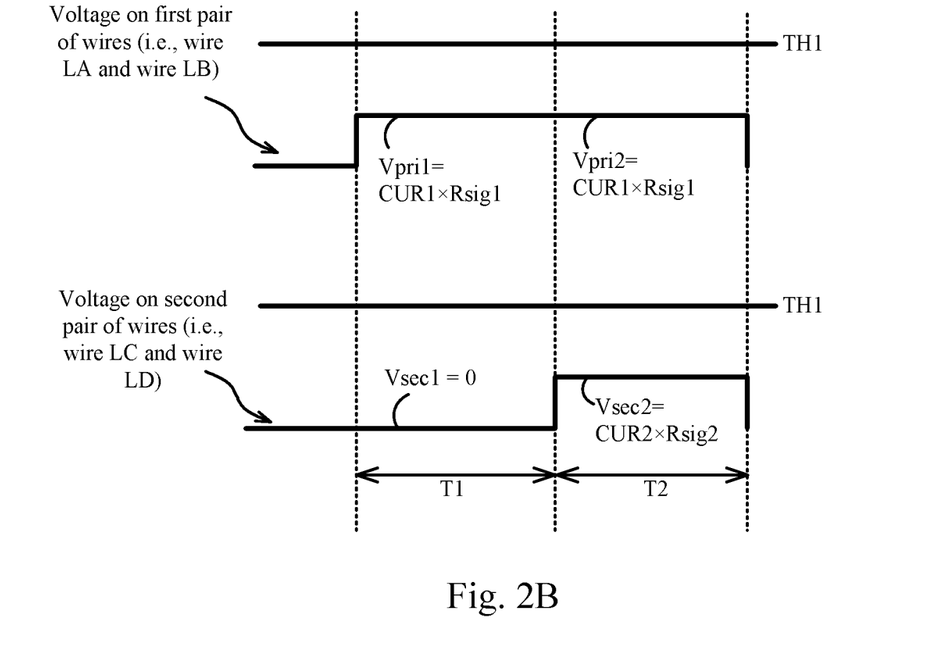
FIG. 2B is a schematic diagram illustrating waveforms of related signals in FIG. 1A according to some embodiments of the present disclosure.

FIG. 2B is a schematic diagram illustrating waveforms of related signals in FIG. 1A according to some embodiments of the present disclosure. For ease of understanding operations of the control logic circuit 120, reference is made to FIG. 1A, FIG. 1B, and FIG. 2B. As mentioned above, during the interval T1, the control logic circuit 120 controls the current source circuit 110a to drain the current CUR1 (which is shown with the solid line) from the powered device 100A via the first pair of wires, and controls the current source circuit 110b not to drain the current CUR2 from the powered device 100A via the second pair of wires. Under this condition, as shown in FIG. 2B, the voltage Vpri1 on the first pair of wires during the interval T1 is equivalent to the voltage drop of the signature resistor Rsig1, i.e., Vpri1=CUR1×Rsig1. Similar to FIG. 2A, the voltage Vsec1 on the second pair of wires during the interval T1 is 0V.

During the interval T2, the control logic circuit 120 controls the current source circuit 110a to drain the current CUR1 (which is shown with the dotted line) from the powered device 100A via the first pair of wires, and controls the current source circuit 110b to drain the current CUR2 (which is shown with the dotted line) from the powered device 100A via the second pair of wires. In this example, the first pair of wires and the second pair of wires are respectively coupled to the signature resistor Rsig1 and the signature resistor Rsig2. Therefore, during the interval T2, the current flowing to the first pair of wires is the current CUR1, and the current flowing to the second pair of wires is the current CUR2. Under this condition, as shown in FIG. 2B, during the interval T2, the voltage Vpri2 on the first pair of wires is equivalent to the voltage drop of the signature resistor Rsig1, i.e., Vpri2=CUR1×Rsig1. Similarly, during the interval T2, the voltage Vsec2 on the second pair of wires is equivalent to the voltage drop of the signature resistor Rsig2, i.e., Vsec2=CUR2×Rsig2.

In some embodiments, the control logic circuit 120 compares the voltage Vpri1 with the voltage Vsec1, and compares the voltage Vpri1 with the voltage Vpri2, in order to determine whether the powered device 100A is a dual signature powered device. As shown in FIG. 2B, if the voltage Vpri1 is the same as the voltage Vpri2, and the voltage Vpri1 is higher than the voltage Vsec1, the control logic circuit 120 determines that the powered device 100A is a dual signature powered device.

In some embodiments, as shown in FIG. 1A and FIG. 2A (or FIG. 2B), the control logic circuit 120 is further configured to compare a predetermined threshold value TH1 with a corresponding one of the voltage Vpri1 (or the voltage Vpri2) and the voltage Vsec2, in order to determine whether a corresponding one of the first pair of wires and the second pair of wires is open circuit. For example, if the first pair of wires is open circuit (for example, being disconnected from the powered device 100A), the first pair of wires has an infinite resistance with respect to the power sourcing equipment 100. Under this condition, if the control logic circuit 120 controls the current source circuit 110a to drain the current via the first pair of wires, the voltage Vpri1 on the first pair of wires is increased quickly to be higher than the predetermined threshold value TH1. As a result, the control logic circuit 120 determines that the first pair of wires is open circuit. With this analogy, if the second pair of wires is open circuit, the voltage Vsec2 on the second pair of wires is increased quickly to be higher than the predetermined threshold value TH1. As a result, the control logic circuit 120 determines that the second pair of wires is open circuit.

In some embodiments, the predetermined threshold value TH1 may be stored in a register (not shown) of the control logic circuit 120 in advance. In some embodiments, the predetermined threshold value TH1 may be inputted to the control logic circuit 120 via an input/output interface.

In some embodiments, the control logic circuit 120 is able to detect a non-standard powered device with the above operations. In some embodiments, if the control logic circuit 120 determines that the powered device 100A is not a single signature power device, a dual signature powered device, or a non-standard powered device, the control logic circuit 120 determines that the powered device 100A is an invalid powered device, and thus stops performing the connection. The non-standard powered device may be a device that excludes a rectifier circuit or a device that causes a part of pairs of wires to be open circuit. For example, the powered device 100A is a dual signature powered device that only includes partial circuits (which may be, for example, the rectifier circuit 125A, the signature resistor Rsig1, the classification circuit 135A, and/or the other circuit 137A). When the powered device 100A is connected to the power sourcing equipment 100, the second pair of wires is open circuit as the second pair of wires is disconnected from circuits (e.g., the rectifier circuit 125B, the signature resistor Rsig2, the classification circuit 135B, and/or the other circuit 137B) in the powered device 100A. Under this condition, the control logic circuit 120 determines that the powered device 100A is a dual signature powered device according to the voltage Vpri1 and the voltage Vpri2, and determines that the second pair of wires is open circuit according to the voltage Vsec2 and the predetermined threshold value TH1. Accordingly, the control logic circuit 120 is able to determine that the powered device 100A is the non-standard powered device.

FIG. 3 is a flow chart of a connection checking method 300 according to some embodiments of the present disclosure. In some embodiments, the connection checking method 300 may be, but not limited to, performed by the control logic circuit 120 in FIG. 1A.

In operation S310, a first current source circuit is controlled to drain a current from a powered device via a first pair of wires in a network cable during a first interval, in order to detect a first voltage on the first pair of wires and a second voltage on a second pair of wires in the network cable. In operation S320, the first current source circuit and a second current source circuit are controlled to drain currents from the powered device via the first pair of wires and the second pair of wires respectively during a second interval, in order to detect a third voltage on the first pair of wires and a fourth voltage on the second pair of wires. In operation S330, whether the powered device is a single signature powered device or a dual signature powered device according to the first voltage, the second voltage, the third voltage, and the fourth voltage.

The above operations of the connection checking method 300 can be understood with reference to various embodiments discussed above, and thus the repetitious descriptions are not given. The above description of the connection checking method 300 includes exemplary operations, but the operations are not necessarily performed in the order described above. Operations of the connection checking method 300 may be added, replaced, changed order, and/or eliminated as appropriate, or the operations are able to be executed simultaneously or partially simultaneously as appropriate, in accordance with the spirit and scope of various embodiments of the present disclosure.

As described above, the power sourcing equipment and the connection checking method are able to detect a type of the powered device and to determine whether the network cable is open circuit by draining current(s).

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely some embodiments of the present disclosure, without any intention to limit the scope of the present disclosure thereto. Various equivalent changes, alterations, or modifications based on the claims of present disclosure are all consequently viewed as being embraced by the scope of the present disclosure.

What is claimed is:

1. A power sourcing equipment, comprising:
   a plurality of current source circuits configured to be coupled to a powered device via a first pair of wires and a second pair of wires in a network cable respectively; and
   a control logic circuit configured to:
      control a first current source circuit in the plurality of current source circuits to drain a current from the powered device via the first pair of wires during a first interval, in order to detect a first voltage on the first pair of wires and a second voltage on the second pair of wires;
      control the plurality of current source circuits to drain a plurality of currents from the powered device via the first pair of wires and the second of pair of wires respectively during a second interval, in order to detect a third voltage on the first pair of wires and a fourth voltage on the second pair of wires; and
      determine whether the powered device is a single signature powered device or a dual signature powered device according to the first voltage, the second voltage, the third voltage, and the fourth voltage,
      wherein whether the powered device is the single signature powered device is determined based on a comparison result of the third voltage and the fourth voltage, and whether the powered device is the dual signature powered device is determined based on a comparison result of the first voltage and the second voltage.

2. The power sourcing equipment of claim 1, wherein the control logic circuit is configured to control a second current source circuit in the plurality of current source circuits not to drain a current from the powered device during the first interval, and the second current source circuit is coupled to the powered device via the second pair of wires.

3. The power sourcing equipment of claim 1, wherein the control logic circuit is configured to compare the first voltage with the third voltage, and to compare the third voltage with the fourth voltage, in order to determine whether the powered device is the single signature powered device.

4. The power sourcing equipment of claim 3, wherein if the first voltage is lower than the third voltage and the third voltage is the same as the fourth voltage, the control logic circuit determines that the powered device is the single signature powered device.

5. The power sourcing equipment of claim 1, wherein the control logic circuit is configured to compare the first voltage with the third voltage, and to compare the first voltage with the second voltage, in order to determine whether the powered device is the dual signature powered device.

6. The power sourcing equipment of claim 5, wherein if the first voltage is the same as the third voltage, and if the first voltage is higher than the second voltage, the control logic circuit determines that the powered device is the dual signature powered device.

7. The power sourcing equipment of claim 1, wherein the control logic circuit is further configured to compare a predetermined threshold value with a corresponding one of the first voltage and the second voltage, in order to determine whether a corresponding one of the first pair of wires and the second pair of wires is open circuit.

8. The power sourcing equipment of claim 7, wherein if the corresponding one of the first voltage and the second voltage is higher than the predetermined threshold value, the control logic circuit determines that the corresponding one of the first pair of wires and the second pair of wires is open circuit.

9. The power sourcing equipment of claim 7, wherein if the control logic circuit determines that the powered device is the single signature powered device or the dual signature powered device, and determines that the corresponding one of the first pair of wires and the second pair of wires is open circuit, the control logic circuit determines that the powered device is a non-standard powered device.

10. The power sourcing equipment of claim 1, further comprising:
an analog to digital converter circuit coupled to the first pair of wires and the second pair of wires, and configured to generate a plurality of digital codes according to the first voltage, the second voltage, the third voltage, and the fourth voltage, wherein the control logic circuit is configured to determine whether the powered device is the single signature powered device or the dual signature powered device according to the plurality of digital codes.

11. A connection checking method, comprising:
controlling a first current source circuit to drain a current from a powered device via a first pair of wires in a network cable during a first interval, in order to detect a first voltage on the first pair of wires and a second voltage on a second pair of wires in the network cable;
controlling the first current source circuit and a second current source circuit to drain a plurality of currents from the powered device via the first pair of wires and the second of pair of wires respectively during a second interval, in order to detect a third voltage on the first pair of wires and a fourth voltage on the second pair of wires; and
determining whether the powered device is a single signature powered device or a dual signature powered device according to the first voltage, the second voltage, the third voltage, and the fourth voltage,
wherein whether the powered device is the single signature powered device is determined based on a comparison result of the third voltage and the fourth voltage, and whether the powered device is the dual signature powered device is determined based on a comparison result of the first voltage and the second voltage.

12. The connection checking method of claim 11, wherein controlling the first current source circuit to drain the current from a powered device via the first pair of wires in the network cable during the first interval comprises:
controlling the second current source circuit not to drain a current from the powered device during the first interval.

13. The connection checking method of claim 11, wherein determining whether the powered device is the single signature powered device or the dual signature powered device according to the first voltage, the second voltage, the third voltage, and the fourth voltage comprises:
comparing the first voltage with the third voltage, and comparing the third voltage with the fourth voltage, in order to determine whether the powered device is the single signature powered device.

14. The connection checking method of claim 13, wherein if the first voltage is lower than the third voltage and the third voltage is the same as the fourth voltage, determining that the powered device is the single signature powered device.

15. The connection checking method of claim 11, wherein determining whether the powered device is the single signature powered device or the dual signature powered device according to the first voltage, the second voltage, the third voltage, and the fourth voltage comprises:
comparing the first voltage with the third voltage, and comparing the first voltage with the second voltage, in order to determine whether the powered device is the dual signature powered device.

16. The connection checking method of claim 15, wherein if the first voltage is the same as the third voltage, and the first voltage is higher than the second voltage, determining that the powered device is the dual signature powered device.

17. The connection checking method of claim 11, further comprising:
comparing a predetermined threshold value with a corresponding one of the first voltage and the second voltage, in order to determine whether a corresponding one of the first pair of wires and the second pair of wires is open circuit.

18. The connection checking method of claim 17, wherein if the corresponding one of the first voltage and the second voltage is higher than the predetermined threshold value, determining that the corresponding one of the first pair of wires and the second pair of wires is open circuit.

19. The connection checking method of claim 17, wherein if the powered device is determined to be the single signature powered device or the dual signature powered device, and the corresponding one of the first pair of wires and the second pair of wires is determined to be open circuit, determining that the powered device is a non-standard powered device.

20. The connection checking method of claim 11, further comprising:
generating, by an analog to digital converter circuit, a plurality of digital codes according to the first voltage, the second voltage, the third voltage, and the fourth voltage,
wherein determining whether the powered device is the single signature powered device or the dual signature powered device according to the first voltage, the second voltage, the third voltage, and the fourth voltage comprises:
determining whether the powered device is the single signature powered device or the dual signature powered device according to the plurality of digital codes.

* * * * *